(12) United States Patent  
Sessler et al.

(10) Patent No.: US 9,389,003 B2  
(45) Date of Patent: Jul. 12, 2016

(54) SOLAR COLLECTOR

(75) Inventors: Michael Sessler, Ein Habesor (IL); Alon Waisman, Ramat Gan (IL); Michael Plaschkes, D.N. Negev (IL)

(73) Assignee: MAGEN ECO ENERGY (A.C.S.) LTD., Negev (IL)

( * ) Notice: Subject to any disclaimer, the term of this patent is extended or adjusted under 35 U.S.C. 154(b) by 613 days.

(21) Appl. No.: 13/699,627

(22) PCT Filed: Apr. 28, 2011

(86) PCT No.: PCT/IL2011/000336  
§ 371 (c)(1),  
(2), (4) Date: Jan. 14, 2013

(87) PCT Pub. No.: WO2011/148367  
PCT Pub. Date: Dec. 1, 2011

(65) Prior Publication Data  
US 2013/0112190 A1    May 9, 2013

Related U.S. Application Data

(60) Provisional application No. 61/347,400, filed on May 22, 2010, provisional application No. 61/429,159, filed on Jan. 2, 2011.

(51) Int. Cl.  
*F24J 2/05* (2006.01)  
*F24J 2/24* (2006.01)  
*F24J 2/46* (2006.01)

(52) U.S. Cl.  
CPC .. *F24J 2/05* (2013.01); *F24J 2/242* (2013.01); *F24J 2/243* (2013.01); *F24J 2/245* (2013.01); *F24J 2/464* (2013.01); *F24J 2/465* (2013.01); *F24J 2/4647* (2013.01); *F24J 2002/4679* (2013.01); *Y02E 10/44* (2013.01)

(58) Field of Classification Search  
CPC ............. F24J 2/242; F24J 2/243; F24J 2/245; F24J 2/464; F24J 2/465; F24J 2/05; F24J 2/4647; F24J 2002/4679; Y02E 10/44  
See application file for complete search history.

(56) References Cited

U.S. PATENT DOCUMENTS

| 3,859,980 | A | | 1/1975 | Crawford |
| 4,133,298 | A | * | 1/1979 | Hayama ........................ 126/591 |
| 8,096,295 | B1 | * | 1/2012 | Eyal ............................ F24J 2/05 |
| | | | | 126/569 |

FOREIGN PATENT DOCUMENTS

| CH | 621622 | | 2/1981 |
| DE | 102008050618 | | 4/2010 |
| WO | WO 2009/032577 | * | 3/2009 |

OTHER PUBLICATIONS

International Search Report mailed Jan. 26, 2012 for PCT/IL2011/000336 filed Apr. 28, 2011.

* cited by examiner

*Primary Examiner* — Alfred Basichas  
(74) *Attorney, Agent, or Firm* — A. C. Entis-IP Ltd.

(57) ABSTRACT

A solar collector has first and second manifolds and tubes that provide fluid communication between the manifolds. An enclosure of the collector extends between first and second ends thereof that are respectively proximal to the first and second manifolds, and the tubes extend out of the enclosure at the first and second ends passed a seal at each end to connect to the first and second manifolds.

18 Claims, 7 Drawing Sheets

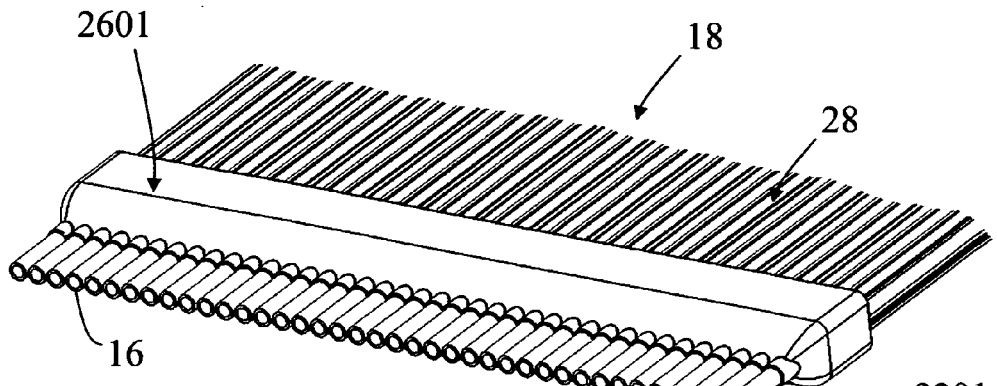
Fig. 16
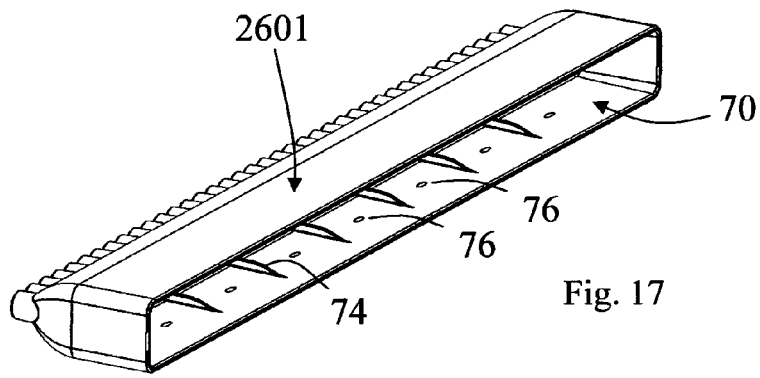
Fig. 17
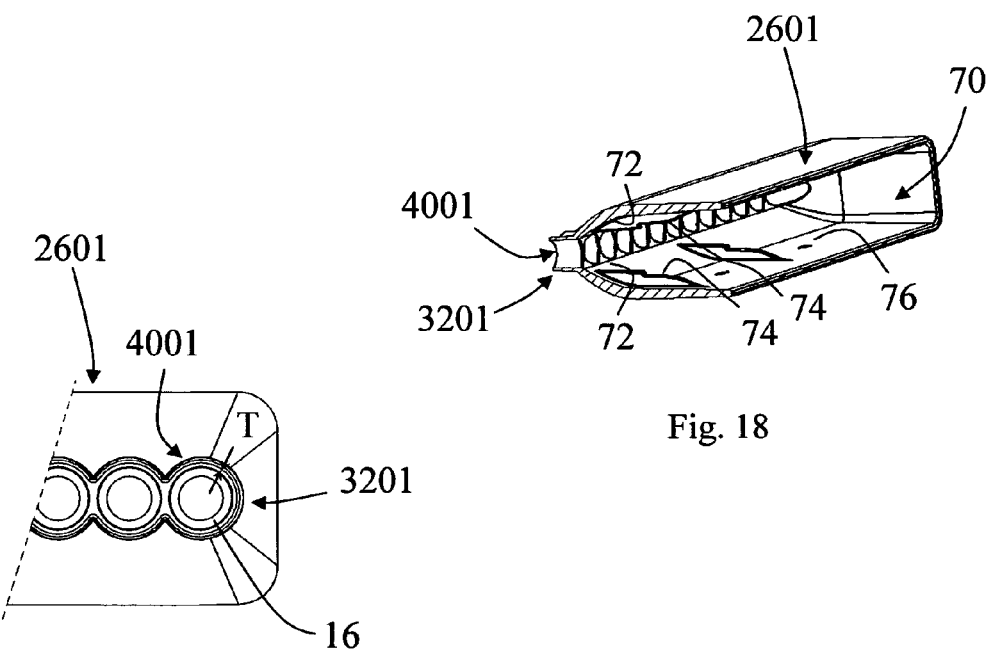
Fig. 18
Fig. 19

SOLAR COLLECTOR

RELATED APPLICATIONS

The present application is a US National Phase of PCT Application No. PCT/IL2011/000336, filed on Apr. 28, 2011, which claims the benefit under 35 U.S.C. 119(e) of U.S. Provisional Patent Application 61/347,400 filed on May 22, 2010; and U.S. Provisional Patent Application 61/429,159 filed on Jan. 2, 2011, the disclosures of which are incorporated herein by reference.

TECHNICAL FIELD

Embodiments of the present invention relate to solar collectors and in particular to solar collectors with spaced manifolds and a plurality of tubes connected to and extending between the manifolds.

BACKGROUND

Such solar collectors may include an enclosure that encloses the tubes for increasing solar energy absorption and/or for preventing the convection of heat from its structure by the surrounding atmosphere.

U.S. Pat. No. 3,859,980 describes a solar heating unit that has a pair of manifolds and tubes that connect the two manifolds and the entire solar heating unit is enclosed in a clear flexible envelope. The envelope is held spaced from the tubes thereby forming a space both above and below the tubes that provides a sheet of air insulation which prevents the convection of heat from the tubes into the surface on which the unit is mounted and also into the atmosphere above and surrounding the unit.

SUMMARY

The following embodiments and aspects thereof are described and illustrated in conjunction with systems, tools and methods which are meant to be exemplary and illustrative, not limiting in scope.

In an embodiment of the present invention there is provided a solar collector that comprises first and second axially spaced apart manifolds, a plurality of axially extending tubes that provide fluid communication between the manifolds and an enclosure being at least partially transparent, the enclosure extends axially between first and second axial ends thereof, the first end being proximal to the first manifold and the second end being proximal to the second manifold, the tubes extend through the enclosure and out of the enclosure at the first and second axial ends of the enclosure to respectively connect to the first and second manifolds, wherein the enclosure comprises at least at a given one of its axial ends a seal that is fitted thereto to form a close fit engagement with the tubes exiting that given end of the enclosure. The seal being close fitted to the tubes may refer in some embodiments to the seal being in contact with the tubes, or in other embodiments to the seal being fitted close to the tubes with a small tolerance or gap being formed between portions of the seal adjacent the tubes and the tubes passing therethrough. Such close fitting may function to substantially prevent or limit entry of liquid or dirt from the outside environment into the enclosure at that given end of the enclosure.

Optionally, the enclosure comprises a plurality of compartments, adjacent compartment being separated by a partition wall and each compartments extending axially through the enclosure to open out of the enclosure at the first and second ends of the enclosure, and wherein at least one tube extends axially through each compartment.

Optionally, each compartment comprises an upper portion and a lower portion separated from the upper portion by a dividing floor, and wherein the at least one tube in each compartment extends through the upper portion.

If desired, an axial gap is formed between each given tube and an upper side of the compartment through which the given tube extends.

Optionally, the tubes are adapted to deform by expansion and contraction due to thermal changes and thereby slide out and in of the enclosure passed the seal.

Optionally, the seal comprises apertures that are formed therethrough and each tube extends through a given one of the apertures in the seal.

Optionally, each tube at least partially contacts the aperture through which it passes.

If desired, the seal has an axial width W when coupled to the enclosure and each aperture in the seal has a raised structure formed on a peripheral inner face thereof that comprises a rim that is adapted to contact the tube passing therethrough, and wherein the rim of each raised structure has an axial extension smaller than W.

Optionally, each given raised structure comprises a pair of tapering faces that converge radially inwardly to meet at the rim of the raised structure.

In an embodiment of the present invention there is also provided a solar collector comprising first and second axially spaced apart manifolds, a plurality of axially extending tubes that provide fluid communication between the manifolds and an enclosure being at least partially transparent, the enclosure extending axially between first and second axial ends thereof, the first end being proximal to the first manifold and the second end being proximal to the second manifold, the tubes extending out of the enclosure beyond the first and second ends of the enclosure to respectively connect to the first and second manifolds, the enclosure comprising a plurality of compartments with adjacent compartments being separated by a partition wall and each compartment extending axially through the enclosure to open out of the enclosure at the first and second ends of the enclosure, wherein at least one tube extends axially through each compartment.

Optionally, the tubes extend beyond the first and second ends out of the enclosure along a distance D that is exposed to the environment outside of the enclosure.

Optionally, each compartment comprises an upper portion and a lower portion separated from the upper portion by a dividing floor, and wherein the at least one tube in each compartment extends through the upper portion.

If desired, an axial gap is formed between each given tube and an upper side of the compartment through which the given tube extends.

Optionally, the enclosure comprises at least at a given one of its axial ends a seal that is fitted thereto to form a close fit engagement with the tubes exiting that given end of the enclosure. The seal being close fitted to the tubes may refer in some embodiments to the seal being in contact with the tubes, or in other embodiments to the seal being fitted close to the tubes with a small tolerance or gap being formed between portions of the seal adjacent the tubes and the tubes passing therethrough. Such close fitting may function to substantially prevent or limit entry of liquid or dirt from the outside environment into the enclosure at that given end of the enclosure.

Optionally, the tubes are adapted to deform by expansion and contraction due to thermal changes and thereby slide out and in of the enclosure passed the seal.

Optionally, the seal comprises apertures that are formed therethrough and each tube extends through a given one of the apertures in the seal.

If desired, the seal has an axial width W when coupled to the enclosure and each aperture in the seal has a raised structure formed on a peripheral inner face thereof that comprises a rim that is adapted to contact the tube passing therethrough, and wherein the rim of each raised structure has an axial extension smaller than W.

Optionally, each given raised structure comprises a pair of tapering faces that converge radially inwardly to meet at the rim of the raised structure.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which:

FIG. 16 schematically shows a view similar to that in FIG. 4 but with a cover in accordance with another embodiment of the present invention attached to the glazed part of the enclosure;

FIG. 17 schematically shows a perspective rear view of the cover in FIG. 16 that constitutes another embodiment of a seal in accordance with the present invention;

FIG. 18 schematically shows a perspective rear view of the cover in FIG. 16 in cross section;

FIG. 19 schematically shows a front view of a portion of the cover in FIG. 16;

Figure 1:
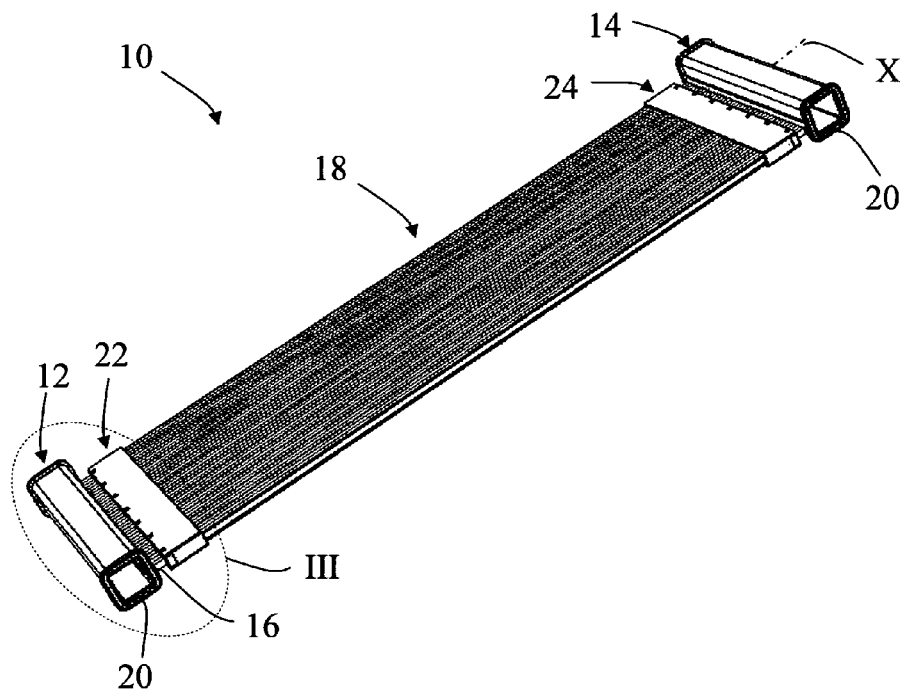
FIG. 1 schematically shows a perspective view of a solar collector in accordance with an embodiment of the present invention including two manifolds and an enclosure through which extend a plurality of tubes between the manifolds.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1. A solar collector 10 in accordance with an embodiment of the present invention has a pair of first and second manifolds 12, 14 and a plurality of tubes 16 that provide fluid communication between the two manifolds 12, 14. In a non-binding example, the tubes 16 may be formed from a polymer such as HTN, CPVC, polypropylene, polyethylene, polybutylene (etc.). The tubes 16 extend generally parallel to an axis X through an enclosure 18 of the solar collector 10 and the manifolds 12, 14 are spaced apart along that axis X and extend each perpendicular to that axis X between two sides 20.

The solar collector 10 may be used as a single unit configuration as shown in FIG. 1 to circulate fluid such as water that is heated by optionally solar radiation especially at the tubes 16 and in such a configuration the sides 20 of the manifolds 12, 14 may be closed and/or coupled to fluid inlet or outlet means (not shown). Alternatively, the single unit configuration shown in FIG. 1 may be part of an array of such units that are assembled together side by side to heat fluid and in such a configuration the sides 20 of the manifolds may also be coupled to sides 20 of adjacent similar manifolds of such units.

It should be noted that directional terms appearing throughout the specification and claims, e.g. "forward", "rear", "up", "down" etc., (and derivatives thereof) are for illustrative purposes only, and are not intended to limit the scope of the appended claims. In addition it is noted that the directional terms "down", "below" and "lower" (and derivatives thereof) define identical directions.

Figure 2:
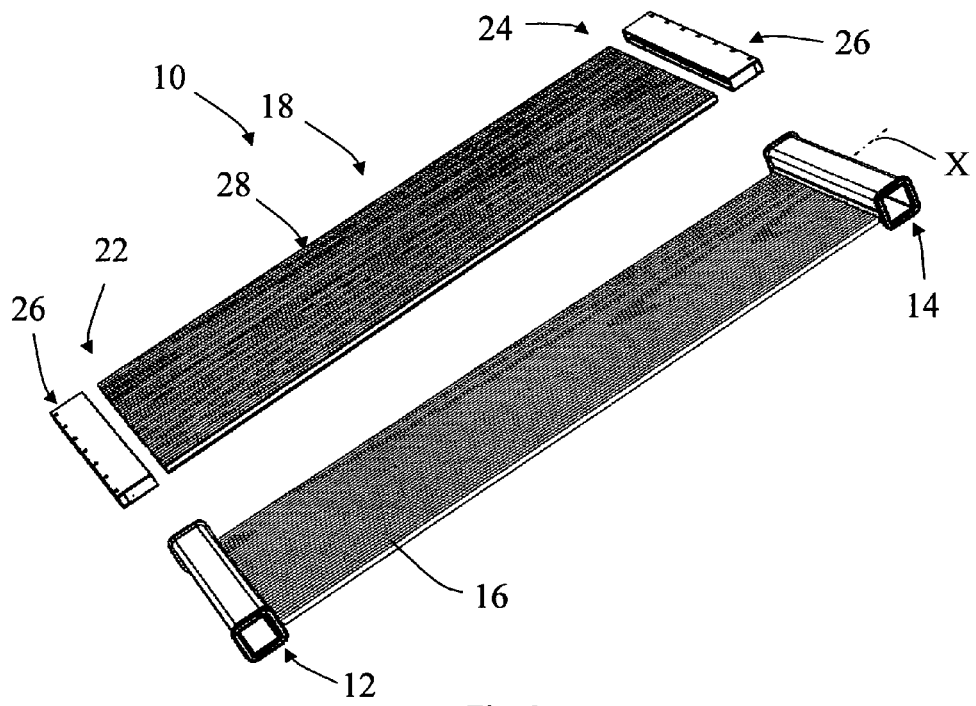
FIG. 2 schematically shows solar collector as in FIG. 1 but with the enclosure being displaced from its location in the collector and exploded into a glazed part and two covers in accordance with an embodiment of the present invention.

Attention is additionally drawn to FIG. 2. The enclosure 18 extends along the axis X between first and second axial ends 22, 24 thereof that are respectively proximal to the first and second manifolds 12, 14. The enclosure 18 includes two covers 26 in accordance with an embodiment of the present invention that are located each at a respective one of its axial ends 22, 24 and a glazed part 28 that is located therebetween and is transparent at least at portions thereof. The glazed part 28 may have a unitary integral one-piece construction and may be formed in a non-bonding example from materials such as polycarbonate, PMMA, PVC, (etc.) that are optionally also UV protected.

Figure 3:
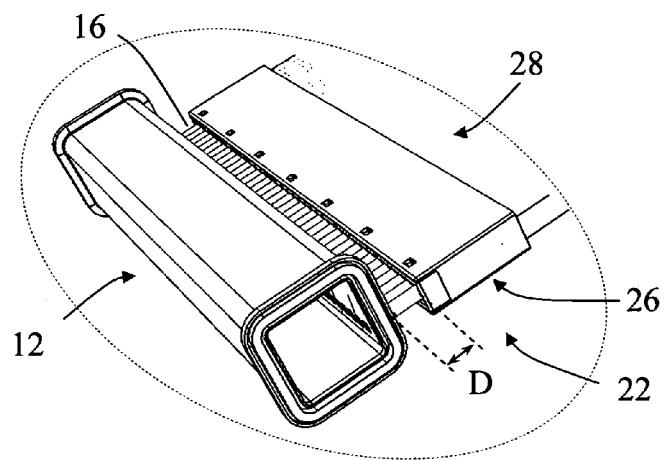
FIG. 3 is a section of FIG. 1 showing one end of the solar collector adjacent one of the manifolds.
Figure 4:
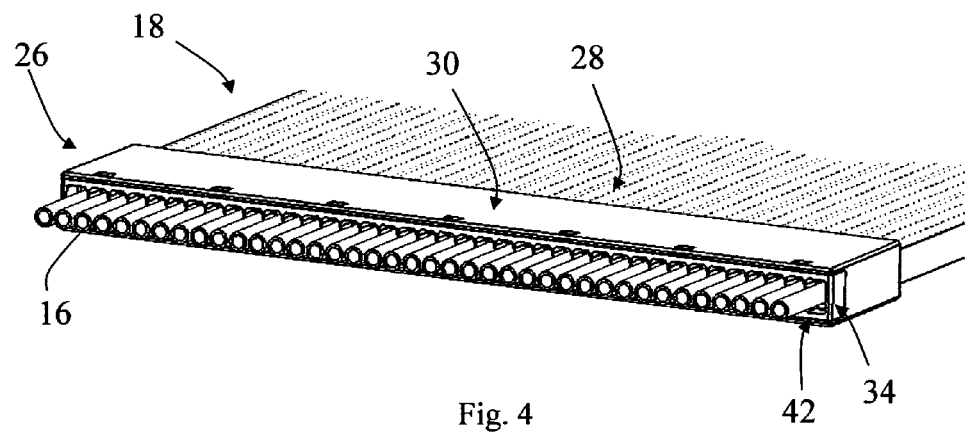
FIG. 4 schematically shows the end of the solar collector in FIG. 3 with the manifold removed.
Figure 5:
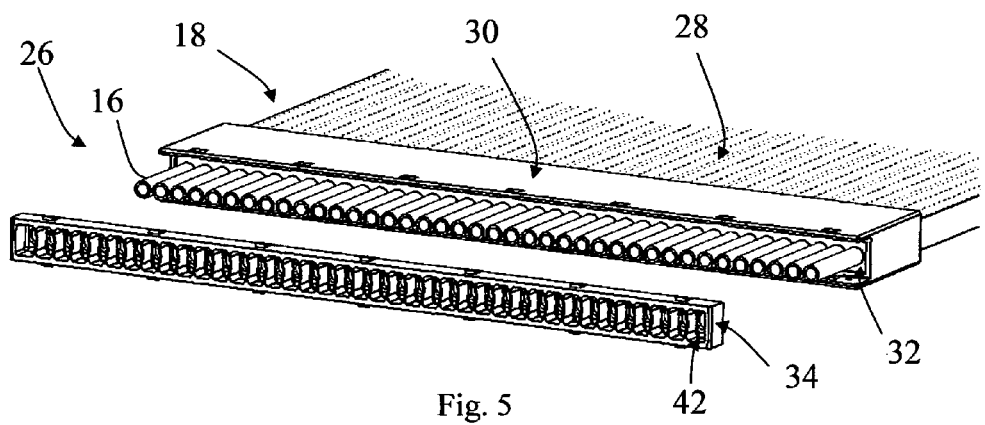
FIG. 5 schematically shows a view similar to that of FIG. 4 with a clasp of the cover displaced.
Figure 6:
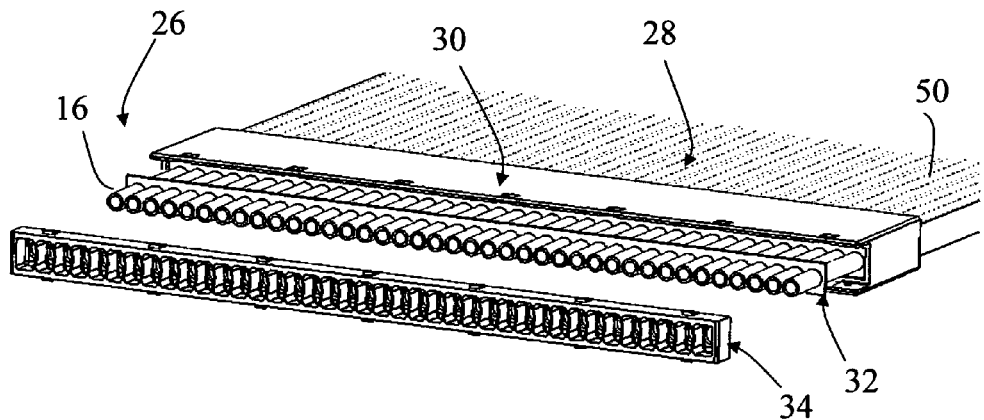
FIG. 6 schematically shows a view similar to that of FIG. 5 also with an embodiment of a seal of the cover being displaced.
Figure 7:
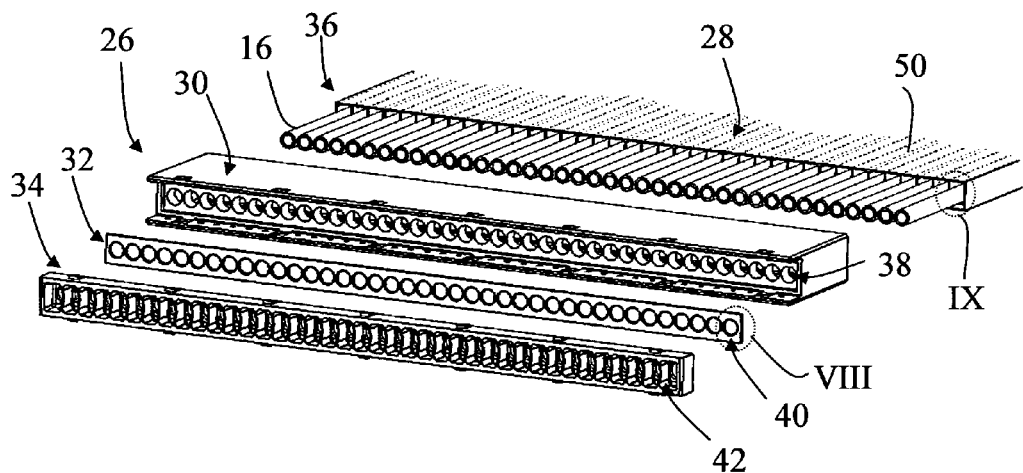
FIG. 7 schematically shows a view similar to that of FIG. 6 also with a housing of the cover being displaced from the glazed part.

Attention is drawn to FIG. 3. The tubes 16 extending through the enclosure 18 exit the enclosure 18 at its axial ends 22, 24 and extend onwards optionally along a distance D outside of the enclosure 18 where they are exposed to the environment outside of the enclosure 18 before reaching the manifolds 12, 14. In use, the tubes 16 of the collector 10 are exposed to environmental conditions outside of the collector 10 and thereby may exhibit deformation in the form of expansion or contraction due to thermal changes in the environment or in the fluid flowing therethrough. Such deformation in the elongation direction of the tubes 16 along the axis X may result in the lengthening or shortening of the tubes 16 which in turn may affect the distance D that the tubes 16 extend out of the enclosure 18. Optionally the distance D when substantially no such deformation is present in the tubes 16 is chosen to be such that upon maximum shortening of the tubes 16, the axial ends 22, 24 of the enclosure 18 will not abut and/or bear against the manifolds 12, 14.

Attention is drawn to FIGS. 4 to 7. In an embodiment, the cover 26 of the enclosure 18 has a housing 30, a seal 32 in accordance with an embodiment of the present invention and a clasp 34. The housing 30 is adapted to attach optionally by adhesive at its rear to an axial end 36 of the glazed part 28, the seal 32 is adapted to be placed over the front of the housing 30 and the clasp 34 is adapted to be placed over the seal 32 and optionally snap fit into the housing 30 in order to secure the seal 32 to the housing 30. Each tube 16 on its way out of the enclosure 18 first passes through an optional hole 38 in the housing 30, then through an optional aperture 40 in the seal 32 and finally through an opening 42 in the clasp 34 towards the adjacent manifold 12, 14. In non-binding examples, the seals 32 may be formed from a rubber such as EPDM, VITON (etc.) or from a thermoplastic elastomer.

In an embodiment, the seal 32 is adapted to form a close fit engagement with the tubes 16 that pass optionally through its apertures 40 so that entry of for example liquid or dirt from outside of the enclosure 18 and into the enclosure 18 will be substantially prevented or limited. Such liquid or dirt may originate for example from dust or rain and penetration of such dust or rain into the enclosure 18 may harm the transparency of the glazed part 28 of the enclosure 18 and thereby reduce or limit the amount of solar radiation that reaches the tubes 16 to heat the fluid flowing therethrough.

In an embodiment, the outer diameters of the tubes 16 are optionally chosen to be slightly larger than the diameters of the apertures 40 so that the close fit engagement of the seal 32 and the tubes 16 is optionally achieved by each tube 16 forming contact at its periphery with the aperture 40 through which it passes and optionally urging that aperture 40 to elastically expand.

In an embodiment, the close fit engagement between the seal 32 and the tubes 16 is such that the tubes 16 may slide upon and/or passed or by the seal 32 (that remains substantially fixed in place) as they deform by expansion and contraction in the axial direction while still maintaining the functionality of the seal 32 to prevent or limit the entry of for example liquid or dirt into the enclosure 18. In embodiments where each tube 16 forms contact at its periphery with the aperture 40 through which it passes, such sliding of the tubes 16 passes the seal 32 may result in the seal 32 acting as a wiper that wipes the tubes 16 as they frictionally pass through the apertures 40.

Figures 8, 9:
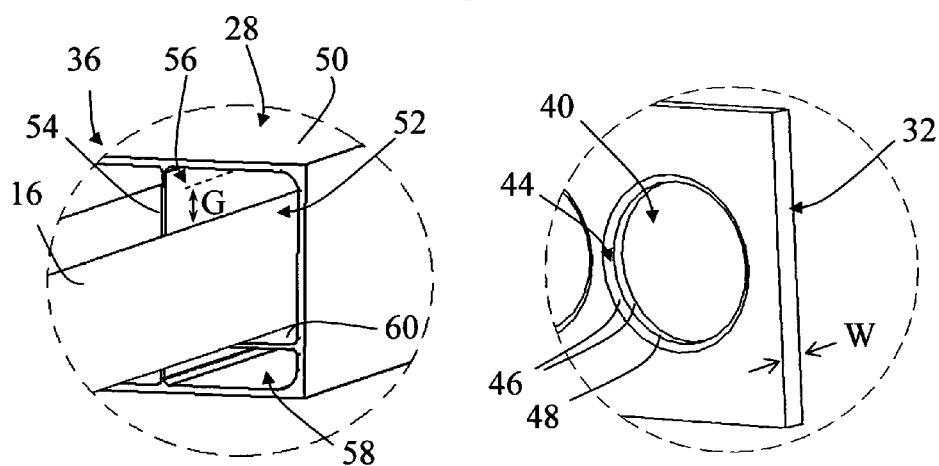
FIG. 8 schematically shows a section of the embodiment of the seal that is shown in FIG. 7.
FIG. 9 schematically shows a section of the glazed part in FIG. 7 with the tubes passing therethrough.
Figure 10:
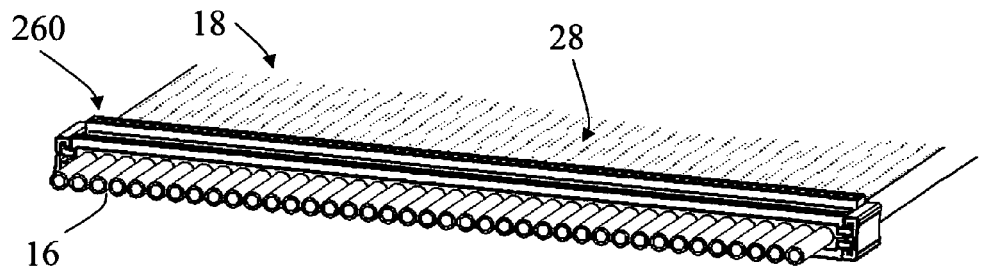
FIG. 10 schematically shows a view similar to that in FIG. 4 but with a cover in accordance with another embodiment of the present invention attached to the glazed part of the enclosure.
Figure 11:
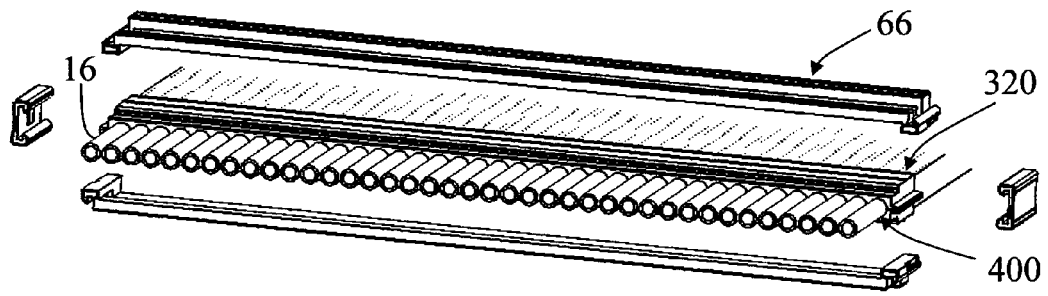
FIG. 11 schematically shows a view similar to that of FIG. 10 with the cover being partially exploded.
Figure 12:
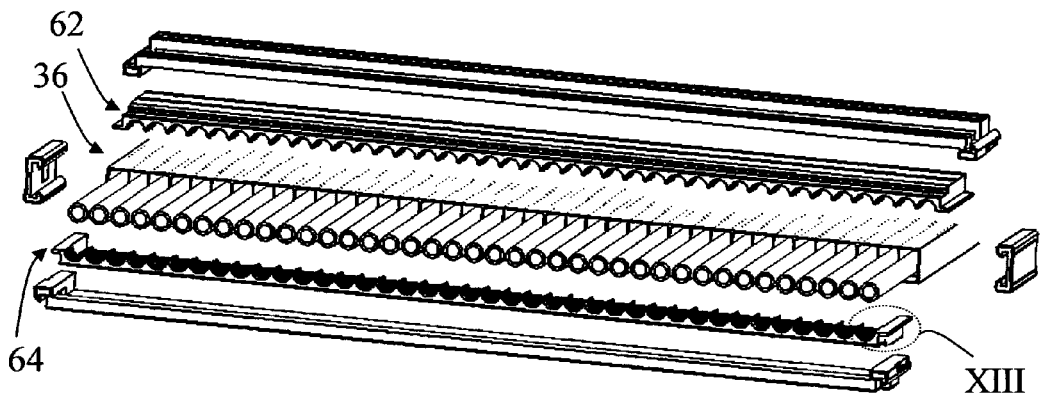
FIG. 12 schematically shows a view similar to that of FIG. 10 with the cover fully exploded to display another embodiment of a seal in accordance with the present invention.
Figure 13:
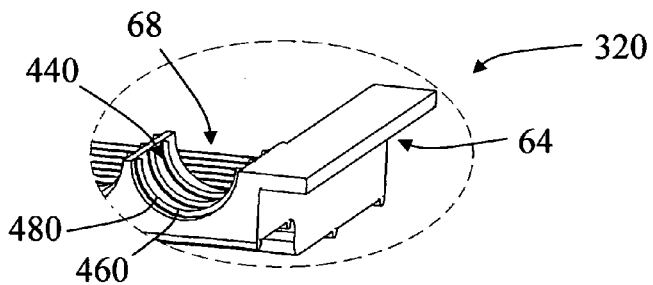
FIG. 13 schematically shows a section of the embodiment of the seal that is shown in FIG. 12.

Attention is now drawn to FIG. 8. In an embodiment, the seal 32 may have on a peripheral inner face 44 of each one of its apertures 40 a raised structure that optionally includes a pair of tapering faces 46 that converge radially inwardly to meet at a raised rim 48. In the optional case where the close fit engagement includes contact between the seal 32 and the tubes 16, these optional raised rims 48 may form a reduced area of contact between the seal 32 and tubes 16 which in turn reduces the frictional forces that may occur when the tubes 16 deform and axially slide in and out of the enclosure 18 upon the seal 32.

Optionally, such raised structures that reduce the area of contact between the seal 32 and tubes 16 may be formed also by for example first providing a seal 32 with initially no (or substantially no) raised structure on the inner faces 44 of its apertures 40 and then axially pressing the seal 32 between the clasp 34 and the housing 30 of the cover 26 to a state in which each one of its inner faces 44 forms for example an arc-like convex deformation (not shown) which includes at its apex a rim such as rim 48 that contacts the tube 16 passing therethrough.

In a seal 32 having an axial width W when assembled in the cover 26, the reduced area of contact at the rim 48 has an axial extension that is smaller than W.

Attention is drawn to FIG. 9. The glazed part 28 has a transparent upper side 50 through which solar radiation is adapted to enter the enclosure 18 to heat the fluid in the tubes 16. The glazed 28 part optionally has in addition a plurality of axially extending compartments 52 that extend therethrough and open out of the glazed part 28 at its axial ends 36. Each pair of adjacent compartments 52 is separated by a partition wall 54 and each compartment 52 may be divided into an axially extending hollow upper portion 56 and an axially extending optionally hollow lower portion 58 that is separated from the upper portion 56 by a dividing floor 60. Optionally, the lower portions 58 of the compartments 52 may have a non-hollow and/or solid form (not shown) such as for example a foamed plastic form or a foamed polyurethane form that is adapted to create thermal insulation.

In an embodiment of the solar collector 10, one tube 16 extends optionally through the upper portion 56 of each compartment 52 of the glazed part 28 and the upper portion 56 of each compartment 52 is optionally sized to form a gap G above each tube 16 between the tube 16 and the upper side 50 of the glazed part 28 that optionally faces incoming solar radiation. This gap G forms a layer of air insulation that prevents the convection of heat from the tubes 16 into the atmosphere above and surrounding the solar collector 10. The lower portions 58 of the compartments 52 form a layer of air insulation or thermal insulation below the tubes 16 and also may form a construction that strengthens the glazed part 28 and helps keep it in shape during use. Optionally, more than one tube 16 may extend through each compartment (not shown) with the gap G being formed optionally above each respective tube 16 and the upper side 50 of the glazed part 28.

Attention is drawn to FIGS. 10 to 13. In an embodiment, a cover 260 of the enclosure 18 may include a seal 320 having upper and lower parts 62, 64 that are held assembled in place over a respective axial end 36 of the glazed part 28 by a supporting outer structure 66. The upper and lower parts 62, 64 of the seal 320 each include a plurality of concave recesses 68 and in the assembled cover 260 each recess 68 in the upper part 62 is adapted overly a corresponding recess 68 in the lower part 64 to form therewith an aperture 400 in the seal 320 through which a tube 16 may pass on its way out of the enclosure 18.

In an embodiment, each recess 68 optionally has on its peripheral inner face 440 three pairs of tapering faces 460. Each pair of faces 460 converges radially inwardly to meet at a raised rim 480 and thereby each aperture 400 in the seal 320 has formed on its inner face 440 three such peripheral raised rims 480. These optional raised rims 480 may form a reduced area of contact between the seal 320 and tubes 16 which in turn reduces the frictional forces that may be present if the tubes 16 contact the apertures 400 of the seal 320 and in the event that the tubes 16 axially deform and slide in and out of the enclosure 18 upon the seal 320.

Figure 14:
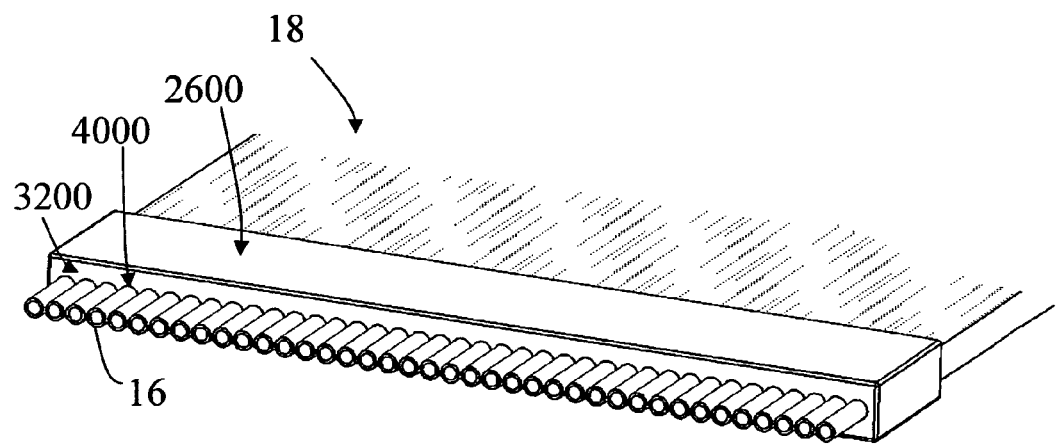
FIG. 14 schematically shows a view similar to that in FIG. 4 but with a cover in accordance with another embodiment of the present invention attached to the glazed part of the enclosure.
Figure 15:
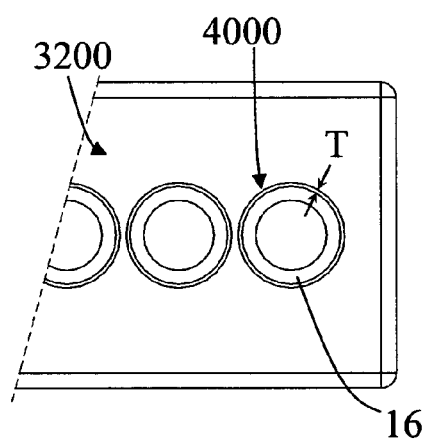
FIG. 15 schematically shows a front view of a portion of the cover in FIG. 14 that constitutes another embodiment of a seal in accordance with the present invention.
Figure 20:
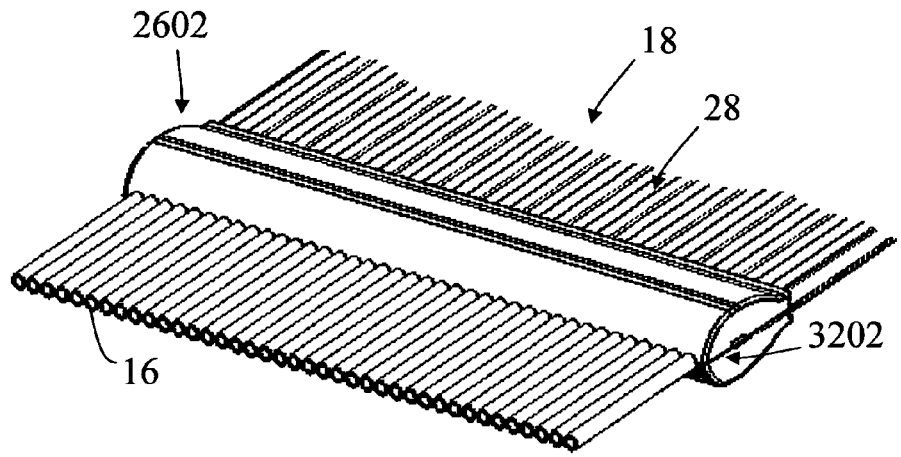
FIG. 20 schematically shows a view similar to that in FIG. 4 but with a cover in accordance with another embodiment of the present invention attached to the glazed part of the enclosure.
Figure 21:
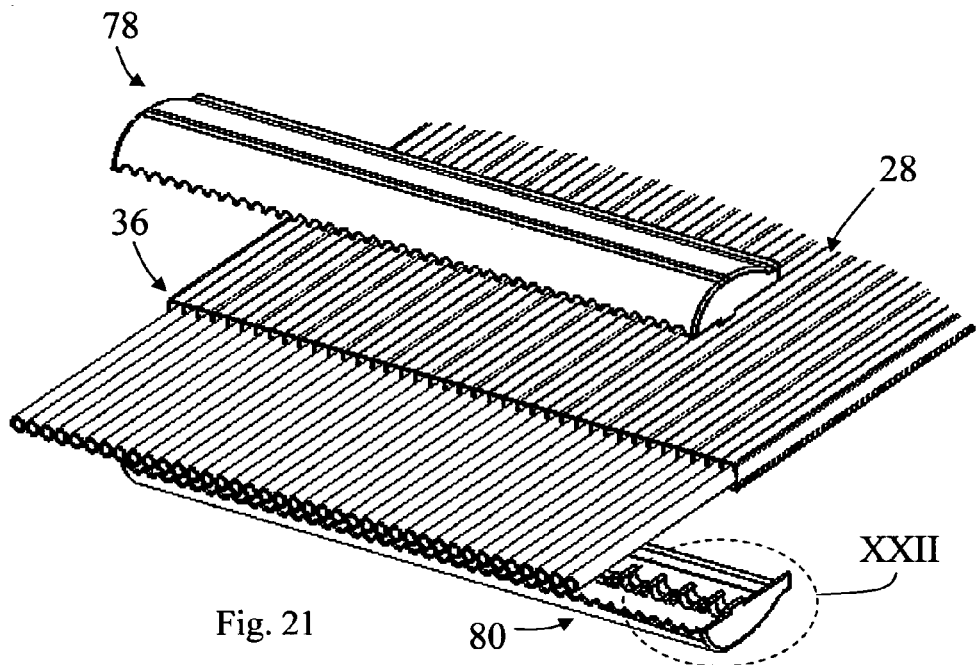
FIG. 21 schematically shows a view similar to that of FIG. 20 with the cover that constitutes another embodiment of a seal in accordance with the present invention being exploded.
Figure 23:
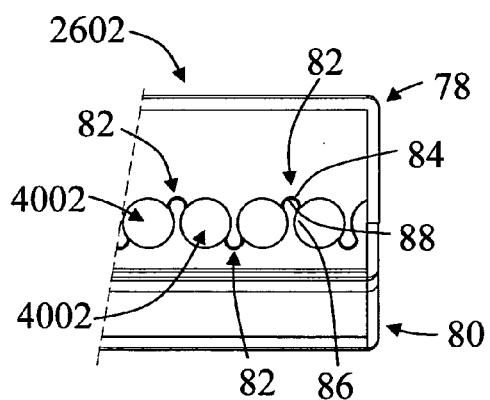
FIG. 23 schematically shows a cross sectional front view of a portion of the cover in FIG. 20.
Figure 22:
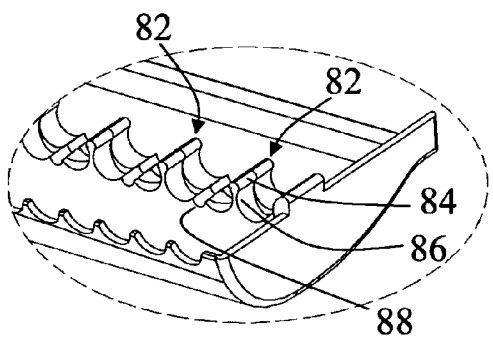
FIG. 22 schematically shows a section of FIG. 21.

Attention is now drawn to FIGS. 14 and 15. In an embodiment, a cover 2600 of the enclosure 18 (or a portion of the cover 2600) constitutes a seal 3200 in accordance with an embodiment of the present invention that is adapted to form the close fit engagement with the tubes 16 in order to substantially prevent or limit entry of for example liquid or dirt from outside of the enclosure 18 and into the enclosure 18. A plurality of apertures 4000 extend axially through the seal 3200 and each tube 16 on its extension out of the enclosure 18 may pass through a respective one of the apertures 4000. Optionally, the outer diameters of the tubes 16 are optionally chosen to be slightly smaller than the diameters of the apertures 4000 by a tolerance T so that each tube 16 passes substantially freely through its aperture 4000.

It should be noted that other embodiments of the collector 10 may utilize other types of structures that constitute a seal in accordance with the present invention that is adapted to be placed at the axial ends 22, 24 of the enclosure 18 in order to form the close fit engagement that substantially prevents or limits the entry of for example liquid or dirt into the enclosure 18. For example, such seals may be in the form of strips of material that are placed at the open axial ends 22, 24 of the enclosure 18.

Attention is now drawn to FIGS. 16 to 19. In an embodiment, a cover 2601 of the enclosure 18 (or a portion of the cover 2601) constitutes a seal 3201 in accordance with an embodiment of the present invention that is adapted to form the close fit engagement with the tubes 16 in order to substantially prevent or limit entry of for example liquid or dirt from outside of the enclosure 18 and into the enclosure 18.

The cover 2601 has a rear cavity 70 that is adapted to fit over the axial end 36 of the glazed part 28 (axial end 36 is shown for example in FIGS. 7 and 12), and a plurality of apertures 4001 extend from the front of the cover 2601 to its rear to open into the cavity 70. Each aperture 4001 is shaped as an axially extending lumen as it extends through the cover 2601 (as best seen in FIG. 18), and these lumen shaped apertures 4001 form the seal 3201. Each tube 16 on its extension out of the enclosure 18 passes through a respective one of the apertures 4001 with the walls of the lumen of the aperture 4001 closely fitting the tube 16.

An inner face of the cavity 70 has upper and lower parts and each part includes a tapering portion 72 that tapers to the location where the apertures 4001 open into the cavity 70. The upper and lower parts of the cavity's inner face include also spacers 74 that are formed thereon and project into the cavity 70 in order to center the axial end 36 of the glazed part 28 within the cavity 70.

The centering of the glazed part 28 in the cavity 70 is such that each compartment 52 (compartment 52 shown in FIG. 9) where it houses a tube 16 is located opposite a respective one of the apertures 4001. This may ease insertion of the tubes 16 into the apertures 4001 when the solar collector 10 is assembled and may limit any bending of the tubes 16 where they extend out of the glazed part 28 and into the apertures 4001. The tapering portions 72 that are formed on the cavity's face also act as a guide or funnel that can facilitate the insertion of each tube 16 into a given one of the apertures 4001 when the solar collector 10 is assembled.

A plurality of drainage holes 76 are formed through the cover 2601 and open into the cavity 70 of the cover 2601 at the lower part of the cavity's face. The drainage holes 76 are adapted to drain out of the enclosure 18 any liquid or dirt that may have entered the enclosure 18 via the seal 3201 and thereby limit the entry of such liquid or dirt into the glazed part 28 of the enclosure 18. Optionally, the outer diameters of the tubes 16 are chosen to be slightly smaller than the diameters of the apertures 4001 by a tolerance T so that each tube 16 passes substantially freely through its aperture 4001 and can thereby slide in and out of the enclosure 18 via the apertures 4001 when for example exhibiting deformation in the form of expansion or contraction due to thermal changes in the environment or in the fluid flowing therethrough.

Attention is now drawn to FIGS. 20 to 23. In an embodiment, a cover 2602 of the enclosure 18 (or a portion of the cover 2602) constitutes a seal 3202 in accordance with an embodiment of the present invention that is adapted to form the close fit engagement with the tubes 16 in order to substantially prevent or limit entry of for example liquid or dirt from outside of the enclosure 18 and into the enclosure 18.

The cover 2602 has upper and lower parts 78, 80 that are adapted to engage each other over the tubes 16 and firmly grip the tubes 16. Each part 78, 80 has on its inner side that faces the tubes 16 a set of successive like ridges 82 with each ridge 82 of the set having a head 84 and a neck 86 that extends away from the head 84 firstly along an inner portion that is narrower than the head 84 and then along an outer portion that becomes wider than the head 84. A set of grooves 88 are formed on each part 78, 80 with each groove 88 being located between adjacent ridges 82 and when assembling the cover 2602 the ridges 82 of each part 78, 80 are located opposite the grooves 88 of the opposing part 78, 80.

In the assembled cover 2602 the heads 84 on each part 78, 80 are located within the grooves 88 of the opposing part 78, 80 thus forming a set of apertures 4002 between the engaging ridges 82 of both parts 78, 80. These apertures 4002 constitute the seal 3202 through which a tubes 16 pass on their way out of the enclosure 18 and due to the fact that the apertures 4002 are sized to grip onto the tubes 16 any deformation of the tubes 16 in the axial direction will urge the cover 2602 to be moved together with the deforming tubes 16 relative to the glazed part 28 of the enclosure 18.

The parts 78, 80 of the cover 2602 are sized to conceal the axial end 36 of the glazed part 18 in the event of such movement of the cover 2602 relative to the glazed part 28 due to the deformation of the tubes 16 so that the cover 2602 and its seal 3202 act to substantially prevent or limit entry of for example liquid or dirt from outside of the enclosure 18 and into the enclosure 18 during use of the solar collector 10.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiment has been described to a certain degree of particularity, it should be understood that various alterations and modifications could be made without departing from the scope of the invention as hereinafter claimed.

The invention claimed is:

1. A solar collector comprising:
   first and second axially spaced apart manifolds;
   a plurality of axially extending tubes that provide fluid communication between the manifolds; and
   an enclosure being at least partially transparent, the enclosure extending axially between first and second axial ends thereof, the first end being proximal to the first manifold and the second end being proximal to the second manifold, the tubes extending through the enclosure and out of the enclosure at the first and second axial ends of the enclosure to respectively connect to the first and second manifolds,
   wherein the enclosure comprises at least at a given one of its axial ends a seal that is fitted thereto to form a close fit engagement with the tubes exiting that given end of the enclosure.

2. The solar collector according to claim 1, wherein the enclosure comprises a plurality of compartments, adjacent compartments being separated by a partition wall and each compartment extending axially through the enclosure and having openings at the first and second ends of the enclosure, and wherein at least one tube extends axially through each compartment.

3. The solar collector according to claim 2, wherein each compartment comprises an upper portion and a lower portion separated from the upper portion by a dividing floor, and wherein the at least one tube in each compartment extends through the upper portion.

4. The solar collector according to claim 2 comprising an axial gap formed between each given tube and an upper side of the compartment through which the given tube extends.

5. The solar collector according to claim 1, wherein the seal is configured to enable a sliding movement of the tubes past the seal.

6. The solar collector according to claim 5, wherein the seal comprises apertures that are formed therethrough and each tube extends through a given one of the apertures in the seal.

7. The solar collector according to claim 6, wherein each tube at least partially contacts the aperture through which it passes.

8. The solar collector according to claim 7, wherein the seal has an axial width W when coupled to the enclosure and each aperture in the seal has a raised structure formed on a peripheral inner face thereof that comprises a rim that is adapted to contact the tube passing therethrough, and wherein the rim of each raised structure has an axial extension smaller than W.

9. The solar collector according to claim 8, wherein each given raised structure comprises a pair of tapering faces that converge radially inwardly to meet at the rim of the raised structure.

10. The solar collector according to claim 2, wherein the tubes extend beyond the first and second ends out of the enclosure a distance D that is exposed to the environment outside of the enclosure.

11. The solar collector according to claim 10, wherein each compartment comprises an upper portion and a lower portion separated from the upper portion by a dividing floor, and wherein the at least one tube in each compartment extends through the upper portion.

12. The solar collector according to claim 2 comprising an axial gap formed between each given tube and an upper side of the compartment through which the given tube extends.

13. The solar collector according to claim 2, wherein the enclosure comprises at least at a given one of its axial ends a seal that is fitted thereto to form a close fit engagement with the tubes exiting that given end of the enclosure.

14. The solar collector according to claim 13, wherein the tubes are adapted to deform by expansion and contraction due to thermal changes and thereby slide out and in of the enclosure passed the seal.

15. The solar collector according to claim 14, wherein the seal comprises apertures that are formed therethrough and each tube extends through a given one of the apertures in the seal.

16. The solar collector according to claim 15, wherein the seal has an axial width W when coupled to the enclosure and each aperture in the seal has a raised structure formed on a peripheral inner face thereof that comprises a rim that is adapted to contact the tube passing therethrough, and wherein the rim of each raised structure has an axial extension smaller than W.

17. The solar collector according to claim 16, wherein each given raised structure comprises a pair of tapering faces that converge radially inwardly to meet at the rim of the raised structure.

18. A solar collector comprising:
    first and second axially spaced apart manifolds;
    a plurality of axially extending tubes that provide fluid communication between the manifolds; and
    an enclosure extending axially between first and second axial ends thereof, the first end being proximal to the first manifold and the second end being proximal to the second manifold, the tubes extending through the enclosure and out of the enclosure at the first and second axial ends of the enclosure to respectively connect to the first and second manifolds;
    wherein the enclosure comprises a plurality of compartments, adjacent compartments being separated by a partition wall and each compartment extending axially through the enclosure and having openings at the first and second ends of the enclosure, and wherein at least one tube extends axially through each compartment.

* * * * *